(12) United States Patent
Hara et al.

(10) Patent No.: US 8,289,433 B2
(45) Date of Patent: Oct. 16, 2012

(54) IMAGE PROCESSING APPARATUS AND METHOD, AND PROGRAM THEREFOR

(75) Inventors: Nozomi Hara, Kanagawa (JP); Noriaki Nakagawa, Tokyo (JP); Tamaki Kojima, Tokyo (JP); Kenichi Agata, Tokyo (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 11/517,420

(22) Filed: Sep. 8, 2006

(65) Prior Publication Data
US 2007/0058064 A1 Mar. 15, 2007

(30) Foreign Application Priority Data

Sep. 14, 2005 (JP) ................. P2005-266292

(51) Int. Cl.
*H04N 5/235* (2006.01)
*H04N 5/222* (2006.01)
(52) U.S. Cl. ......... 348/333.02; 348/333.04; 348/333.12; 348/333.11; 348/222.1
(58) Field of Classification Search .................. 348/333, 348/12, 333.11, 222.1, 230.1, 333.02, 333.04
See application file for complete search history.

(56) References Cited

U.S. PATENT DOCUMENTS

| | | | | |
|---|---|---|---|---|
| 6,301,440 B1 * | 10/2001 | Bolle et al. | .................... | 396/128 |
| 6,778,216 B1 * | 8/2004 | Lin | .......................... | 348/333.11 |
| 7,038,724 B2 * | 5/2006 | Satoh et al. | .............. | 348/333.05 |
| 7,245,306 B2 * | 7/2007 | Yoshio et al. | ................ | 345/591 |
| 7,508,438 B2 * | 3/2009 | Okamoto et al. | ........ | 348/333.05 |
| 2004/0252217 A1 * | 12/2004 | Battles et al. | ............ | 348/333.01 |

FOREIGN PATENT DOCUMENTS

| | | |
|---|---|---|
| JP | 2000-115627 | 4/2000 |
| JP | 2000-115631 | 4/2000 |
| JP | 2000-134525 | 5/2000 |
| JP | 2002-152567 | 5/2002 |
| JP | 2003-008977 | 1/2003 |
| JP | 2003-262786 | 9/2003 |
| JP | 2004-062868 | 2/2004 |
| JP | 2005-110097 | 4/2005 |

OTHER PUBLICATIONS

User Manuel of Nikon Digital Camera COOLPIX S1 , 2005.

* cited by examiner

*Primary Examiner* — Chieh M Fan
*Assistant Examiner* — Dillon Durnford Geszvain
(74) *Attorney, Agent, or Firm* — Finnegan, Henderson, Farabow, Garrett & Dunner, L.L.P.

(57) ABSTRACT

An image processing apparatus includes the following elements: a generator operable to generate, on the basis of a captured image, an image to be captured with a second setting different from a first setting serving as a present shooting setting; a display controller operable to display, together with the captured image, the image generated by the generator; and a controller operable to control, when the image generated by the generator is selected from among the images displayed by the display controller, the setting so that an image can be captured with the second setting.

15 Claims, 11 Drawing Sheets

FIG. 3
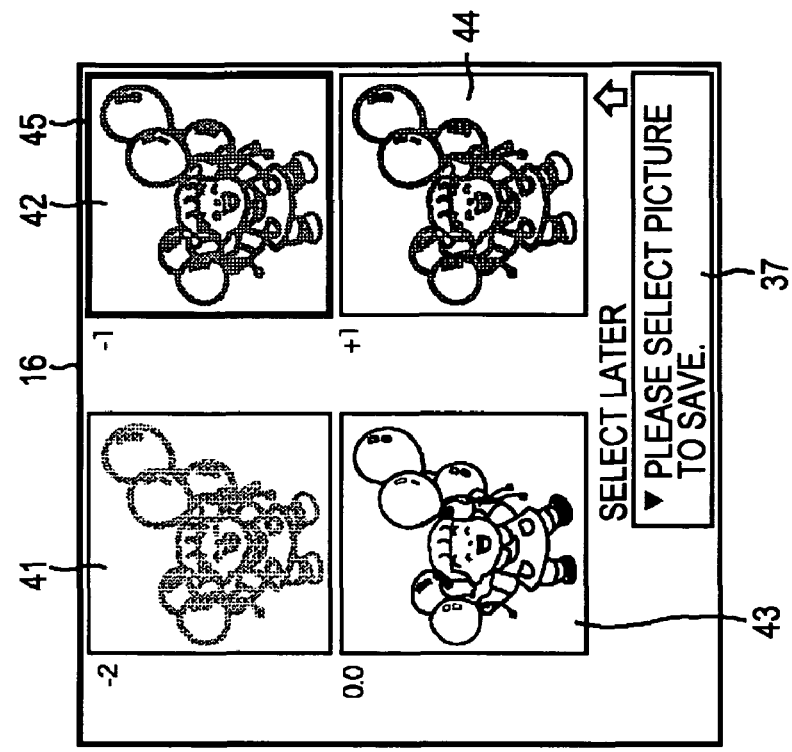
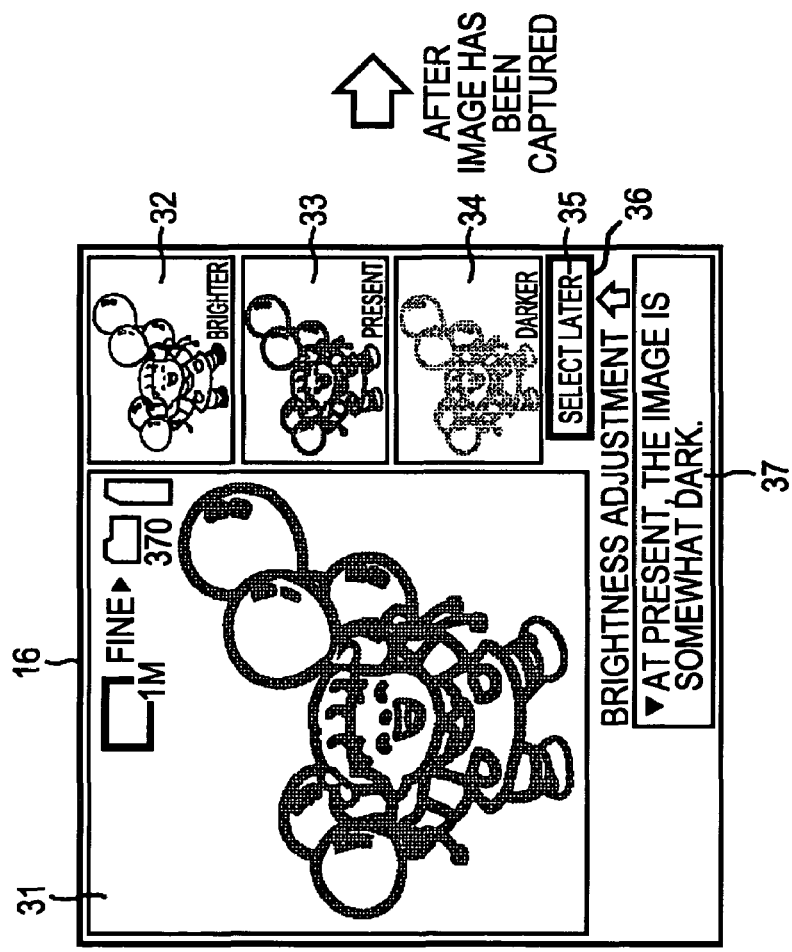

IMAGE PROCESSING APPARATUS AND METHOD, AND PROGRAM THEREFOR

CROSS REFERENCES TO RELATED APPLICATIONS

The present invention contains subject matter related to Japanese Patent Application JP 2005-266292 filed in the Japanese Patent Office on Sep. 14, 2005, the entire contents of which are incorporated herein by reference.

BACKGROUND OF THE INVENTION

1. Field of the Invention

The present invention relates to image processing apparatuses and methods and programs therefor, and in particular, to an image processing apparatus and method and a program therefor for enabling a user to intuitively and efficiently adjust shooting settings.

2. Description of the Related Art

In recent years, digital cameras have become more sophisticated and advanced. Accordingly, shooting settings that the user can select have increased in number.

Various settings are adjusted by the user by, for example, operating a cross key and a determination button while looking at a menu screen displayed on a display unit including a liquid crystal display (LCD) disposed on the back of a digital camera (on the side opposite to a lens).

For example, when the user wants to change the exposure setting, the user selects an item relating to shooting from the menu screen, further selects an item relating to the exposure setting from among items displayed when the shooting item is selected, and further selects a specific value (exposure value (EV) ( . . . , −1.0 EV, −0.3 EV, +0.3 EV, +1.0 EV, . . . )) to use, thereby changing the exposure setting. A digital camera menu is described in, for example an article entitled "IT Media life style: Full-auto de tanoshimeru usugata daigamen digital camera (A full-auto thin large-screen digital camera) "COOLPIX S1", May 11, 2005 (searched on Aug. 9, 2005), which is accessible online at URL=http://www.itmedia.co.jp/lifestyle/articles/0505/11/news087_2.html.

SUMMARY OF THE INVENTION

It is difficult for a user with no knowledge of photography to adjust various shooting settings. For example, when a user with no knowledge of photography looks at the exposure setting, the user has no idea how much influence each value of displayed values " . . . , −1.0 EV, −0.3 EV, +0.3 EV, +1.0 EV, . . . " has on an image to be captured.

When taking a picture using a digital camera, a captured image of an object to be photographed is displayed on a display unit, and the user looks at the captured image and adjusts the brightness or the like. Prior to adjusting the exposure, it is difficult for the user, in the first place, to determine whether the brightness of the captured image is appropriate on the basis of the image displayed on the display unit. Some digital cameras are provided with a function of displaying a histogram of the exposure state of an image in real time as an index to determine the brightness of the image. Even on the basis of the histogram, it involves a certain degree of knowledge to determine the exposure state.

When it is better to change a certain setting prior to capturing an image, it is preferable to have a function of informing the user of such a state. Such a function can be regarded as a user-friendly interface especially for those with no knowledge of photography. For example, when a user trying to capture an image of an object from a very short distance is informed of a better-to-be-selected mode that enables easy focusing suitable for such a state, the user, who was not aware of such a mode until that moment, can change the mode and captures an image with an appropriate setting.

As digital cameras have become more complex and sophisticated, the user may not have been aware of these highly sophisticated functions. Even when the user is aware of such functions, if there are too many selectable functions, the user may have difficulty in finding an item to select from the menu screen. To change the settings on the hierarchical menu screen described above, it is necessary for the user to be acquainted with the hierarchical structure.

In view of the above-described circumstances, it is desirable to enable a user to intuitively and efficiently adjust shooting settings.

An image processing apparatus according to an embodiment of the present invention includes the following elements: generating means for generating, on the basis of a captured image, an image to be captured with a second setting different from a first setting serving as a present shooting setting; display control means for displaying, together with the captured image, the image generated by the generating means; and control means for controlling, when the image generated by the generating means is selected from among the images displayed by the display control means, the setting so that an image can be captured with the second setting.

The generating means may generate images to be captured with a plurality of the second settings. The display control means may display the images generated by the generating means together with the captured image such that the images generated by the generating means have a size smaller than that of the captured image.

The generating means may generate, as the image to be captured with the second setting, an image with a brightness level different from that of the captured image.

When the captured image is brighter or darker than a predetermined brightness level serving as a reference, the display control means may display a message indicating that the captured image is bright or dark.

The generating means may generate, as the image to be captured with the second setting, an image with a contrast higher than that of the captured image.

The generating means may generate an image by enlarging part of the image with the contrast higher than that of the captured image.

When the contrast of the captured image is lower than a predetermined contrast serving as a reference, the display control means may display a message indicating that the captured image is out of focus.

An image processing method or a program therefor according to another embodiment of the present invention includes the steps of generating, on the basis of a captured image, an image to be captured with a second setting different from a first setting serving as a present shooting setting, displaying the generated image together with the captured image, and controlling, when the generated image is selected from among the displayed images, the setting so that an image can be captured with the second setting.

According to the embodiments of the present invention, on the basis of a captured image, an image to be captured with a second setting different from a first setting serving as a present shooting setting is generated, and the generated image is displayed together with the captured image. When the generated image is selected from among the displayed images, the setting is controlled so that an image can be captured with the second setting.

According to the embodiments of the present invention, the shooting setting can be performed intuitively and efficiently.

BRIEF DESCRIPTION OF THE DRAWINGS

FIG. 3 is a diagram illustrating bracket shooting;

FIG. 9 is a flowchart of a process when the brightness correction navigation function is turned on;

FIG. 10 is a flowchart of a process when the macro shooting navigation function is turned on.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus (e.g., a digital camera 1 shown in FIG. 1) according to an embodiment of the present invention includes generating means (e.g., an image generator 62 shown in FIG. 8) for generating, on the basis of a captured image, an image to be captured with a second setting different from a first setting serving as a present shooting setting, display control means (e.g., a display controller 63 shown in FIG. 8) for displaying, together with the captured image, the image generated by the generating means, and control means (e.g., a shooting controller 61 shown in FIG. 8) for controlling, when the image generated by the generating means is selected from among the images displayed by the display control means, the setting so that an image can be captured with the second setting.

Figure 9:
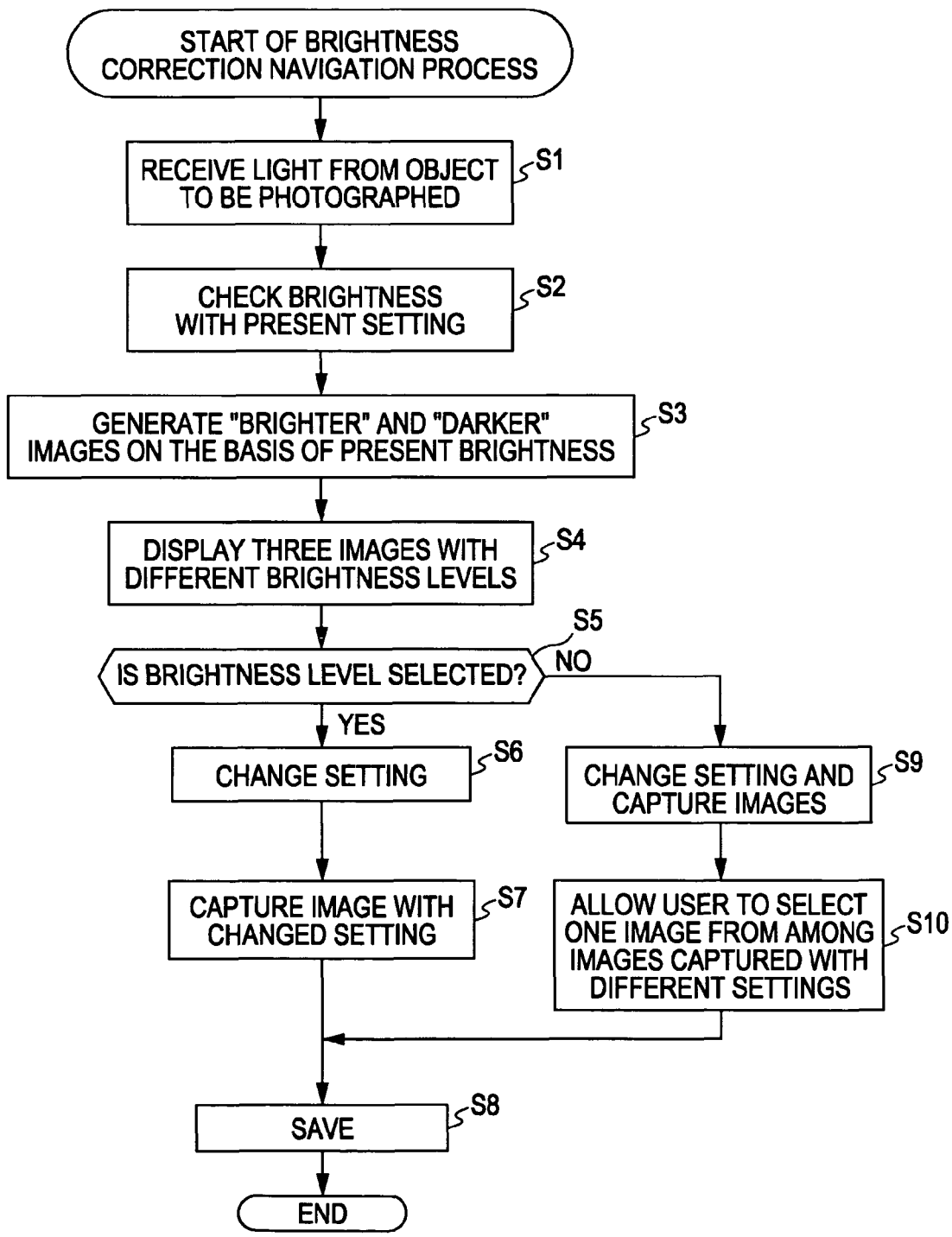

An image processing method or a program therefor according to an embodiment of the present invention includes the steps of generating, on the basis of a captured image, an image to be captured with a second setting different from a first setting serving as a present shooting setting (e.g., step S3 of FIG. 9), displaying the generated image together with the captured image (e.g., step S4 of FIG. 9), and controlling, when the generated image is selected from among the displayed images, the setting so that an image can be captured with the second setting (e.g., step S6 of FIG. 9).

An embodiment of the present invention will now be described with reference to the accompanying drawings.

Figure 1:
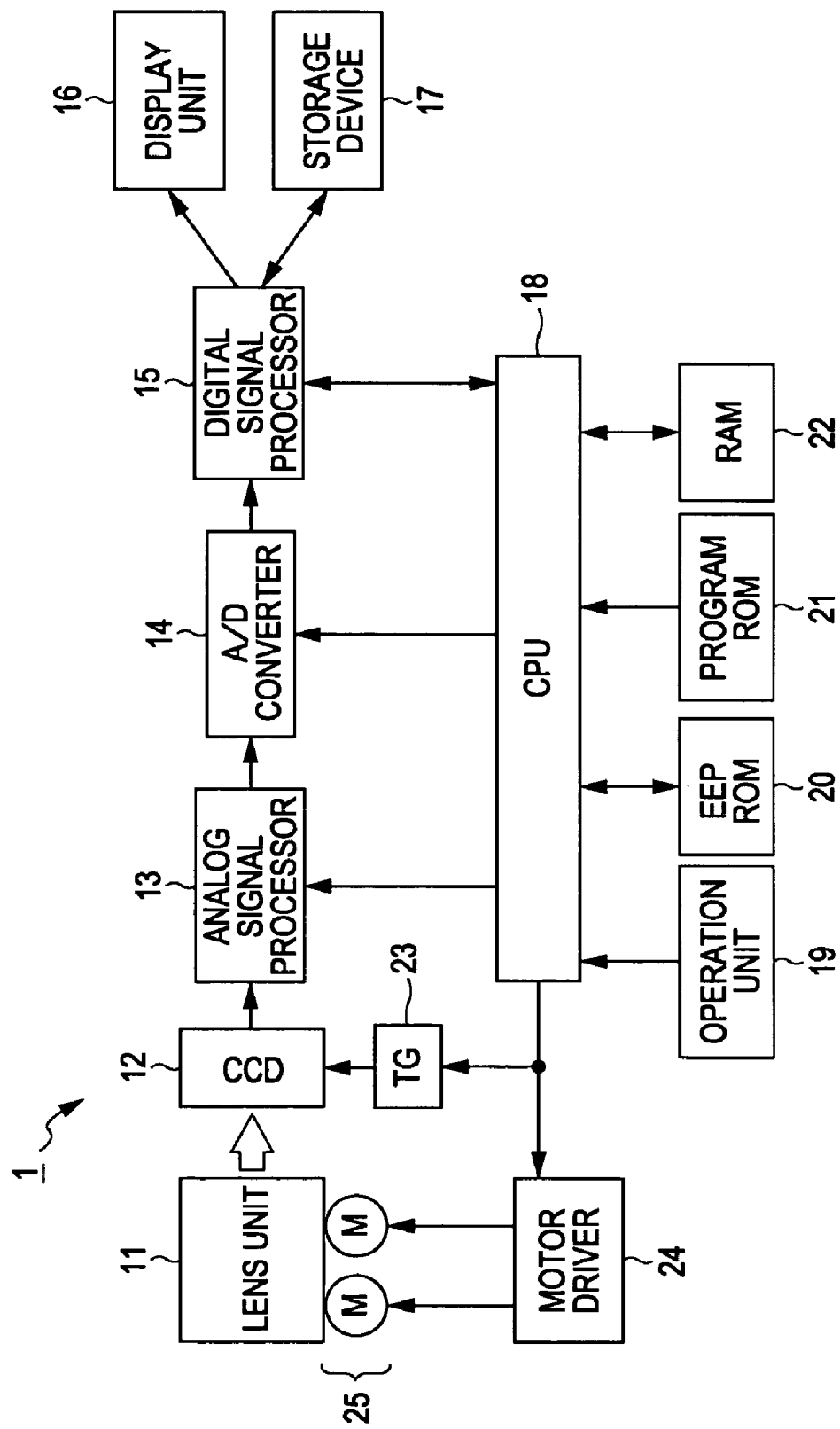
FIG. 1 is a block diagram showing an example of the hardware configuration of a digital camera according to an embodiment of the present invention.

FIG. 1 is a block diagram showing an example of the hardware configuration of the digital camera 1 according to an embodiment of the present invention.

A lens unit 11 includes a focus lens for adjusting focus and a lens that gathers light from an object to be photographed and an optical module including a diaphragm. Light from the object to be photographed, which is gathered by the lens included in the lens unit 11, reaches a charge-coupled device (CCD) 12.

The CCD 12 operates in accordance with a timing signal supplied from a timing generator (TG) 23. More specifically, the CCD 12 receives light from the object to be photographed via the lens unit 11 and converts the received light into an electrical signal or an analog image signal in accordance with the amount of received light, which is in turn output to an analog signal processor 13.

Under the control of a central processing unit (CPU) 18, the analog signal processor 13 performs analog signal processing including amplification or the like of the analog image signal from the CCD 12 and outputs the resultant image signal to an analog-to-digital (A/D) converter 14.

Under the control of the CPU 18, the A/D converter 14 performs A/D conversion of the analog image signal from the analog signal processor 13 and outputs the resultant digital signal or image data to a digital signal processor 15.

Under the control of the CPU 18, the digital signal processor 15 performs digital signal processing including denoising or the like of the image data from the A/D converter 14 and allows a display unit 16 to display an image based on the resultant data.

Also, the digital signal processor 15 compresses the image data from the A/D converter 14 into Joint Photographic Experts Group (JPEG) format or the like and supplies the resultant compressed image data to a recording device 17 to be recorded thereon. Further, the digital signal processor 15 decomporesses the compressed image data recorded on the recording device 17 and allows the display unit 16 to display the resultant image data.

In addition, under the control of the CPU 18, the digital signal processor 15 allows the display unit 16 to display a menu or the like for enabling a user to adjust shooting settings.

The display unit 16 includes an LCD or the like. Under the control of the digital signal processor 15, the display unit 16 displays an image captured by the CCD 12 and a menu screen for use in changing the settings.

The recording device 17 is a removable recording medium, such as a memory card including a semiconductor memory, and can be easily attached to and removed from the digital camera 1. Alternatively, the recording device 17 may include a hard disk drive or the like.

By executing programs recorded in a program read only memory (ROM) 21, or in response to a signal from an operation unit 19, the CPU 18 controls each part included in the digital camera 1 to perform various processes.

As will subsequently be discussed, for example, when the brightness (exposure) of a captured image is greater than a predetermined brightness level serving as a reference (exposure is too much), or when the brightness is less than the predetermined brightness level (exposure is too little), the CPU 18 allows the display unit 16 to display a message informing that and an image brighter than the captured image and an image darker than the captured image, which are generated on the basis of the captured image, thereby enabling the user to change the exposure setting on the screen.

By selecting the image brighter than the captured image, which is displayed on the display unit 16 together with the captured image, the user can capture an imge with a higher exposure. By selecting the image darker than the captured image, the user can capture an image with a lower exposure.

The operation unit 19 includes a power switch, a shutter release, a zoom button, a mode dial (a dial operated to change the shooting mode), a cross key, and a determination button. In response to user operations, the operation unit 19 outputs signals in accordance with the operations to the CPU 18.

Under the control of the CPU 18, an electrically erasable programmable ROM (EEPROM) 20 stores various types of information set in the digital camera 1 and various other types of data, which are necessary to be held even when the digital camera 1 is turned off.

The program ROM 21 stores programs executed by the CPU 18 and data necessary for the CPU 18 to execute the programs. A random access memory (RAM) 22 temporarily stores programs and data necessary for the CPU 18 to perform various processes.

Under the control of the CPU 18, the TG 23 outputs the timing signal to the CCD 12. The exposure time (shutter speed) or the like of the CCD 12 is controlled by the timing signal supplied from the TG 23 to the CCD 12.

Under the control of the CPU 18, a motor driver 24 drives an actuator (motor) 25. By driving the actuator 25, the diaphragm included in the lens unit 11 is adjusted or the focus lens included in the lens unit 11 is moved.

The digital camera 1 is provided with an autofocus function. The autofocus function is implemented using, for example, a hill-climbing servo. When the user presses the shutter release half way down, the focus lens is moved under the control of the motor driver 24 from a predetermined position to a detected in-focus position. For example, the state in which the contrast is highest at the center of an image captured by the CCD 12 (the state in which there are a maximum number of high frequency components) is determined as the in-focus state.

In the digital camera 1 configured as above, the CCD 12 receives light from an object to be photographed, performs photoelectric conversion of the received light into an analog image signal, and outputs the analog image signal. The analog image signal output by the CCD 12 is processed by the analog signal processor 13 and the A/D converter 14 into a digital signal or image data, which is output to the digital signal processor 15.

The digital signal processor 15 outputs the image data from the A/D converter 14 to the display unit 16, and the display unit 16 displays a so-called captured image. The user looks at the image displayed on the display unit 16 and checks whether the brightness or exposure of the captured image of the object is appropriate or whether the captured image is in focus.

Subsequently, when the user presses the shutter release, a signal in response to this is supplied from the operation unit 19 to the CPU 18. Upon supply of the signal from the operation unit 19 in response to the pressing of the shutter release, the CPU 18 controls the digital signal processor 15 to compress the image data supplied from the A/D converter 14 and records the resultant compressed image data on the recording device 17. In this manner, a picture is taken.

The digital camera 1 configured as above is also provided with functions of advising the user on adjustment of the brightness or focus of an image. In accordance with the advice, the user operates the operating unit 19. As a result, the user can capture an image with appropriate exposure or in an in-focus state.

At first, a function of advising the user on adjustment of the brightness of an image (brightness correction navigation function) will be described.

Figure 2:
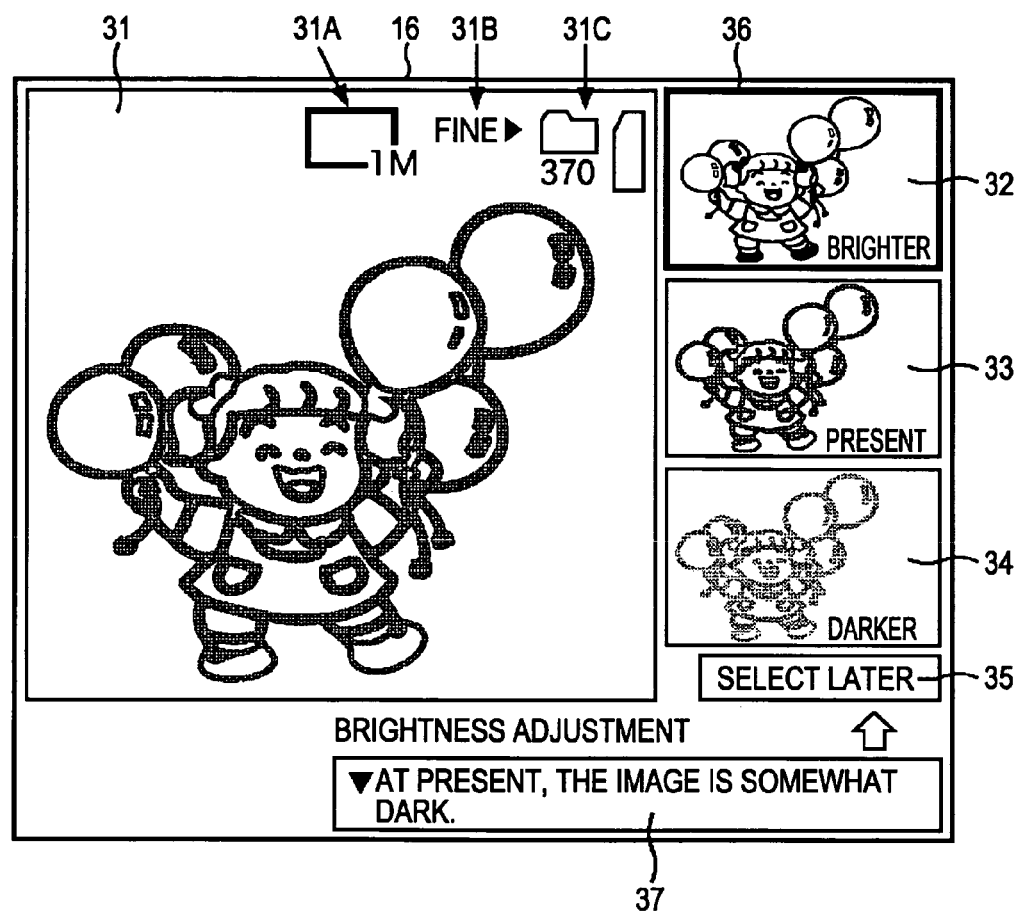
FIG. 2 is a diagram showing an example of a screen displayed by a brightness correction navigation function.

FIG. 2 shows an example of the screen displayed on the display unit 16 by the brightness correction navigation function.

A captured image is displayed in a captured-image display region 31 occupying a relatively large area of the display unit 16. The captured image represents an image that can be captured with the present settings of exposure and the like. The user looks at the image displayed in the captured-image display region 31 and checks the brightness of the image with the present settings. In the example of FIG. 2, an image of a child as an object to be photographed is displayed in the captured-image display region 31.

Icons 31A to 31C displayed in the upper right hand corner of the captured-image display region 31 represent the file size and quality of an image to be captured and the remaining number of images that can be recorded, respectively.

In the example of FIG. 2, images 32 to 34 having a size smaller than that of the captured image and a bracket shooting button 35 are displayed in a column next to the captured image.

The images 32 to 34 are images generated on the basis of the captured image. The contents of the images 32 to 34 are the same as those of the captured image. The user presses the cross button in vertical direction to move a cursor 36 and then presses the determination key, thereby changing the exposure setting so that an image can be captured with the brightness of the image selected by the cursor 36 at the time the determination button is pressed. In the example of FIG. 2, the cursor 36 is shown by a bold line. In this state, the image 32 is selected.

The image 32 is an image with a brightness level expected to be achieved in the case where an image is captured by increasing exposure from the present setting by a predetermined step (to be brighter). To inform the user that the image 32 is achieved by capturing an image with increased exposure, the characters "brighter" are displayed on the image 32.

By positioning the cursor 36 on the image 32 and pressing the determination button, the user can capture an image with increased exposure compared to the present setting.

The image 33 is an image with a brightness level achieved in the case where an image is captured with the present setting. The brightness of the image 33 is the same as that of the captured image displayed in the captured-image display region 31. To inform the user that the image 33 is achieved when an image is captured with the present setting, the characters "present" are displayed on the image 33.

By positioning the cursor 36 on the image 33 and pressing the determination button, the user can capture an image with the present setting.

The image 34 is an image with a brightness level expected to be achieved in the case where an image is captured by reducing exposure from the present setting by a predetermined step (to be darker). To inform the user that the image 34 is achieved by capturing an image with reduced exposure, the image 34 includes the characters "darker" displayed thereon.

By positioning the cursor 36 on the image 34 and pressing the determination button, the user can capture an image with reduced exposure compared to the present setting.

The bracket shooting button 35 is a button to be pressed to select bracket shooting that allows the user to capture a plurality of images with different exposure levels by one pressing of the shutter release. By positioning the cursor 36 on the bracket shooting button 35 and pressing the determination button, the user can perform bracket shooting.

There is a message display region 37 below the images 32 to 34 and the bracket shooting button 35. In the example of FIG. 2, the message "At present, the image is somewhat dark" indicating the state of an image that can be captured with the present setting is displayed. This message is selected and displayed because the brightness of the present setting determined on the basis of the captured image is darker than a reference brightness level, which is regarded as an appropriate exposure.

Reading this message, the user becomes aware that, with the present setting, a darker image is captured. The user thus determines that it is preferable to adjust the brightness. The user selects the image 32 to increase the exposure (by positioning the cursor 36 on the image 32 and pressing the determination button), thereby capturing an image with appropriate exposure.

Instead of a sequence of the values "..., −1.0 EV, −0.3 EV, +0.3 EV, +1.0 EV, ...", images expected to be achieved with different exposure levels are displayed, and the exposure setting can be changed by selecting an image from among the displayed images. Even when the user has no knowledge of photography, the user can intuitively change the exposure setting.

Since images displayed with different brightness levels are generated on the basis of a captured image, the user can easily imagine what the picture would look like when the exposure setting is changed. Since a brighter image and a darker image are displayed together with an image with the present brightness setting at the center, the user can easily compare the brightness levels of these images with the present setting.

The screen shown in FIG. 2 may be displayed at all times when the user turns on (executes) the brightness correction navigation function and tries to capture an image. Alternatively, the screen shown in FIG. 2 may be displayed in the event that, when the user turns on the brightness correction navigation function and tries to capture an image, it is detected that the exposure of a captured image is inappropriate. That is, in the latter case, a captured image is properly displayed on the entire display unit 16. Only when it is detected that the exposure of the captured image is inappropriate, the screen is changed to that of FIG. 2.

FIG. 3 is a diagram illustrating bracket shooting.

As shown on the left-hand side of the diagram of FIG. 3, when the user positions the cursor 36 on the bracket shooting button 35 and presses the determination button, the digital camera 1 becomes ready to perform bracket shooting. When the user presses the shutter release once in this condition, for example, four images are continuously captured with different exposure settings.

The four captured images are displayed in a tile, such as those shown on the right-hand side of FIG. 3. The user can move a cursor 45 to select an image with desired brightness from among the images displayed in a tile. The selected image is recorded on the recording device 17.

In the example shown on the right-hand side of FIG. 3, an image 41 is an image captured with an exposure of −2.0 EV. An image 42 is an image captured with an exposure of −1.0 EV. An image 43 is an image captured with an exposure of 0.0 EV (with the present setting). An image 44 is an image captured with an exposure of +1.0 EV. On the right-hand side of FIG. 3, the message display region 37 displays the message "Please select picture to save" guiding the user to select an image from among the images 41 to 44.

Next, a function of advising the user on focus adjustment (macro shooting navigation function) will be described.

Figure 4:
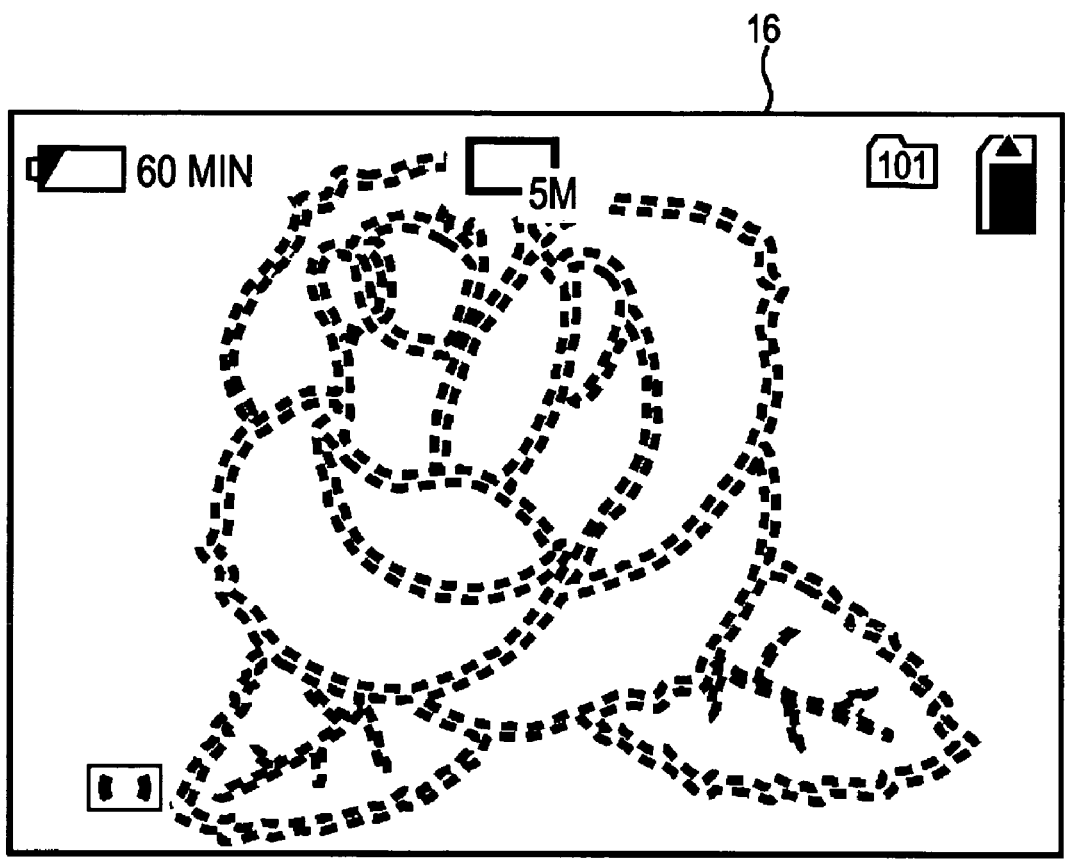
FIG. 4 is a diagram showing an example of a displayed out-of-focus captured image.

When the user is trying to capture an image of an object from a very close distance, which is out of the range in which the autofocus function can focus on the object, the image is out of focus, as shown in FIG. 4. In such a case, in the event that the macro shooting navigation function is turned on, a screen advising the user to change the shooting mode to a macro mode or the like and then to capture an image is displayed.

In the example of FIG. 4, the captured image is displayed on the entire display unit 16. A flower, which is an object to be photographed, is indicated by broken lines because the flower is out of focus.

As has been described above, the digital camera 1 is provided with the autofocus function. Normally, the user uses the autofocus function to capture an image. Apart from the autofocus function, the digital camera 1 is provided with, for example, the macro mode and a magnifying mode, which are shooting modes for focusing on an object at a position closer to the digital camera 1 than the lower limit of a focus range (wide-angle-end focus range) in which the autofocus function can focus on the object.

Figure 5:
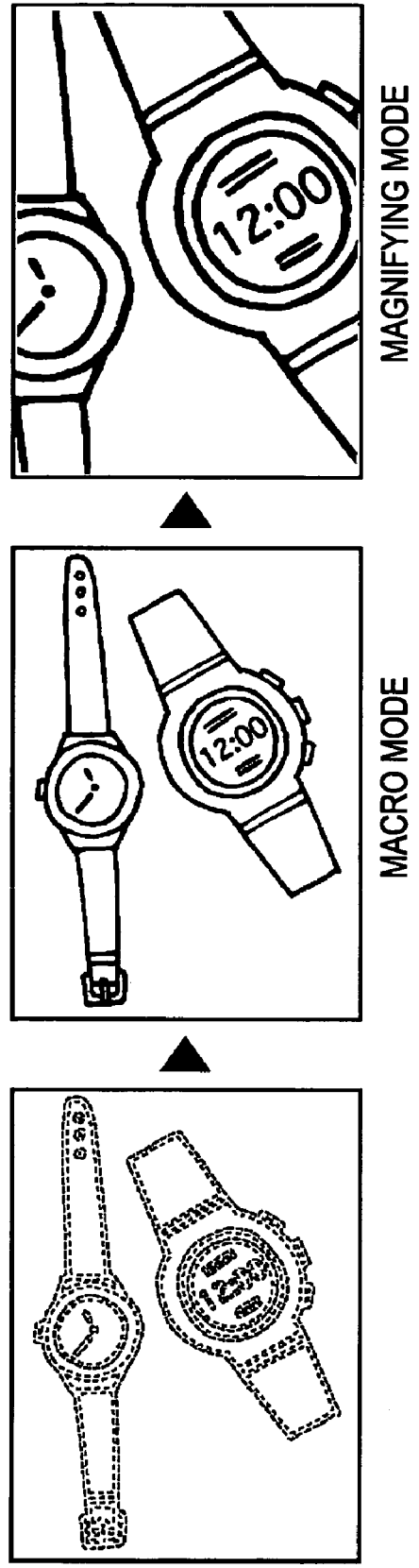
FIG. 5 is a diagram illustrating shooting modes.

FIG. 5 is a diagram illustrating the shooting modes.

For example, as shown on the left of FIG. 5, when it is difficult to focus on an image of an object using the autofocus function because the object is too close, the user can capture an in-focus image of the object in the macro mode, as shown in the middle of FIG. 5. In the magnifying mode, as shown on the right of FIG. 5, a larger image of the object than that in the macro mode can be captured. That is, there are different focus ranges for shooting using the general autofocus function, shooting in the macro mode, and shooting in the magnifying mode.

Depending on the performance of the lenses included in the lens unit 11, whereas the focus range of shooting using the general autofocus function is 0.5 m to ∞, the focus range in the macro mode at wide angle is about 0.08 m to ∞, and the focus range in the macro mode at telephoto is about 0.25 m to ∞. The focus range of the autofocus function is set as a range in which focusing can be performed in a short period of time after the user presses the shutter release half way down (the shooting operation starts). In the macro mode or the like, although it takes time to focus, an image of an object can be captured from a very short distance.

The focus range in the magnifying mode at wide angle is about 0.01 m to 0.2 m. In the magnifying mode, the focus range is fixed at wide angle.

The macro shooting navigation function advises the user of using these shooting modes, namely, the macro mode and the magnifying mode, when the user is trying to capture an image of an object from such a close distance that the user is unable to focus on the object using the autofocus function.

Figure 6:
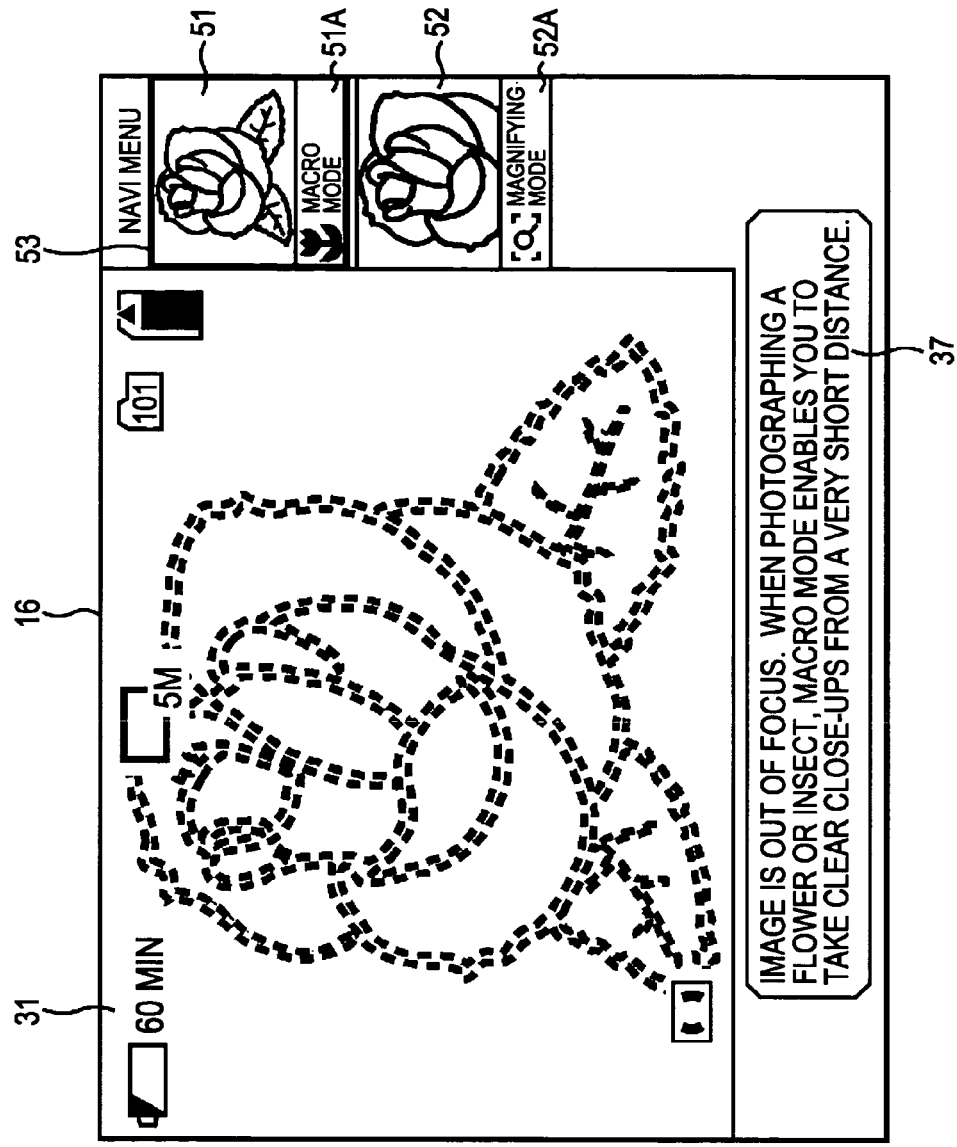
FIG. 6 is a diagram showing an example of a screen displayed by a macro shooting navigation function.

FIG. 6 shows an example of the screen displayed on the display unit 16 by the macro shooting navigation function. Portions corresponding to those in FIG. 2 are designated by the same reference numerals.

In the example of FIG. 6, the same captured image of the flower as that shown in FIG. 4 is displayed in the captured-image display region 31.

In the example of FIG. 6, a menu named "Navi Menu" is displayed next to the captured image. In this menu, an image 51 and an image 52 having a size smaller than that of the captured image are displayed in a column.

The image 51 and the image 52 are images generated on the basis of the captured image (out-of-focus image). The user operates the cross button to move a cursor 53 and then presses the determination key, thereby changing the shooting mode setting so that an image can be captured in a mode selected by the cursor 53 when the determination button is pressed.

The image 51 is an image to be selected to capture an image in the macro mode. For example, the edges of the captured image are enhanced to generate the image 51 expected to be achieved by capturing an image in the macro mode. In a region 51A below the image 51, the characters "macro mode" and an icon (flower mark) are displayed to inform the user that the macro mode can be selected by selecting the image 51.

By positioning the cursor 53 on the image 51 (the image 51 and the region 51A) and pressing the determination button, the user can capture an image in the macro mode.

The image 52 is an image to be selected to capture an image in the magnifying mode. For example, the image 51 is enlarged with respect to a predetermined position thereof as the center of enlargement to generate the image 52 expected to be achieved by capturing an image in the magnifying mode. In a region 52A below the image 52, the characters "magnifying mode" and an icon (magnifying glass mark) are displayed to inform the user that the magnifying mode can be selected by selecting the image 52.

By positioning the cursor 53 on the image 52 (the image 52 and the region 52A) and pressing the determination button, the user can capture an image in the magnifying mode.

In the message display region 37 below the image 51 and the image 52, the message "Image is out of focus . . . " is displayed. This message is selected and displayed since it is determined, on the basis of the captured image, that the user is trying to capture an image of an object from a shorter distance than the digital camera 1 can perform shooting using the autofocus function.

Reading the message, the user is informed that it is difficult to capture an in-focus image with the present setting (using the normal autofocus function) and the user determines that it is better to change the setting of the shooting mode. By selecting, for example, the image 51 (by positioning the cursor 53 on the image 51 and the region 51A), the shooting mode is changed to the macro mode. As a result, an in-focus image of even a very close object can be captured.

Figure 7:
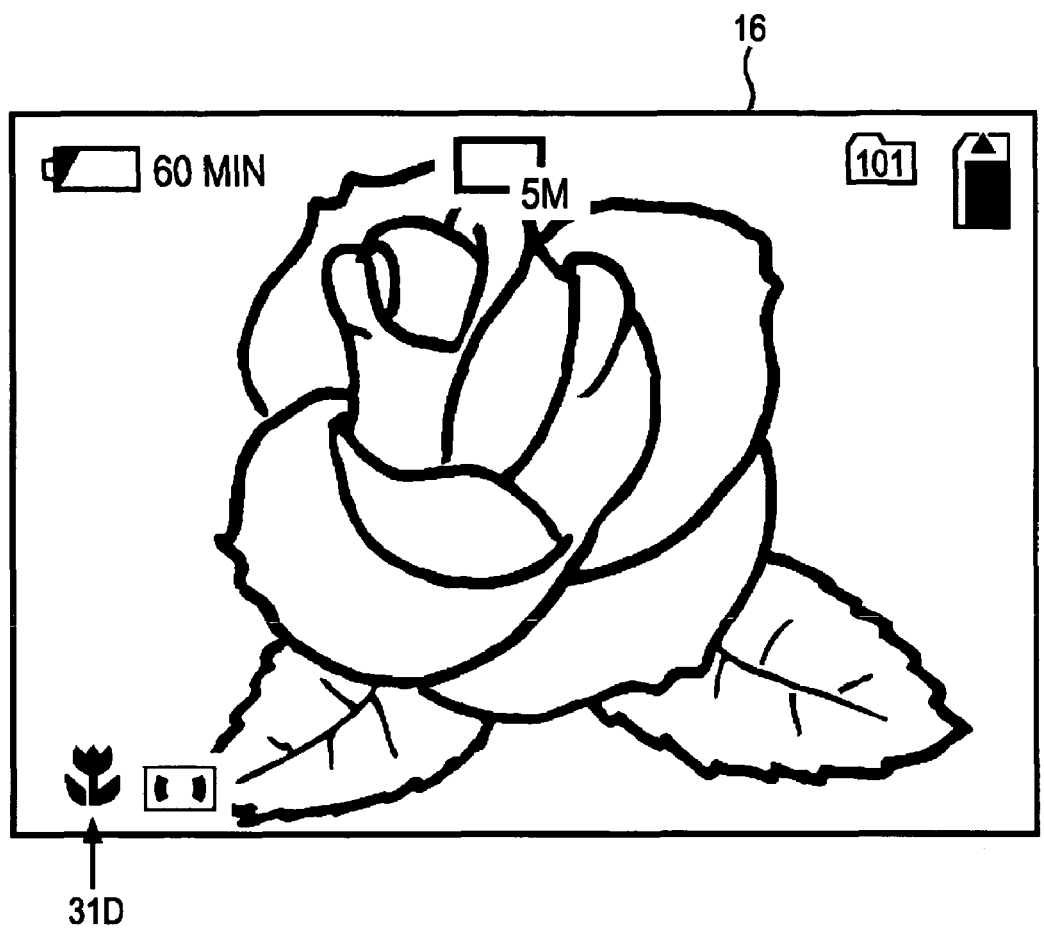
FIG. 7 is a diagram showing an example of an image captured in a macro mode.

FIG. 7 shows an example of the captured image displayed when the macro mode is selected on the screen shown in FIG. 6.

As shown in FIG. 7, an in-focus image of even a very close object can be captured in the macro mode. In the example of FIG. 7, the flower or the object to be photographed is indicated not by broken lines, but by a solid line. This means that the image is in focus. In the example of FIG. 7, an icon 31D displayed in the lower left corner of the captured-image display region 31 indicates that the macro mode is selected as the shooting mode.

In this manner, when it is difficult to obtain an in-focus image, the screen on which the shooting mode can be set is displayed. Compared to the case in which the user first determines that the captured image is out of focus and then sets the shooting mode on the menu screen, the user can efficiently change the setting.

More specifically, it is not necessary for the user to determine whether the captured image is in focus or not. Displays of digital cameras are relatively small in order to ensure portability. It is generally difficult to determine, on the basis of a captured image displayed on such a small display, whether the image is in focus or not.

It is also unnecessary for the user to know where the item for setting the shooting mode, such as the macro mode, is on the menu screen.

Since the images displayed to set the shooting mode are generated on the basis of the captured image, the user can easily imagine what would happen when the shooting mode is changed.

The operation of the digital camera 1 for performing such display will be described subsequently with reference to the flowcharts.

Figure 8:
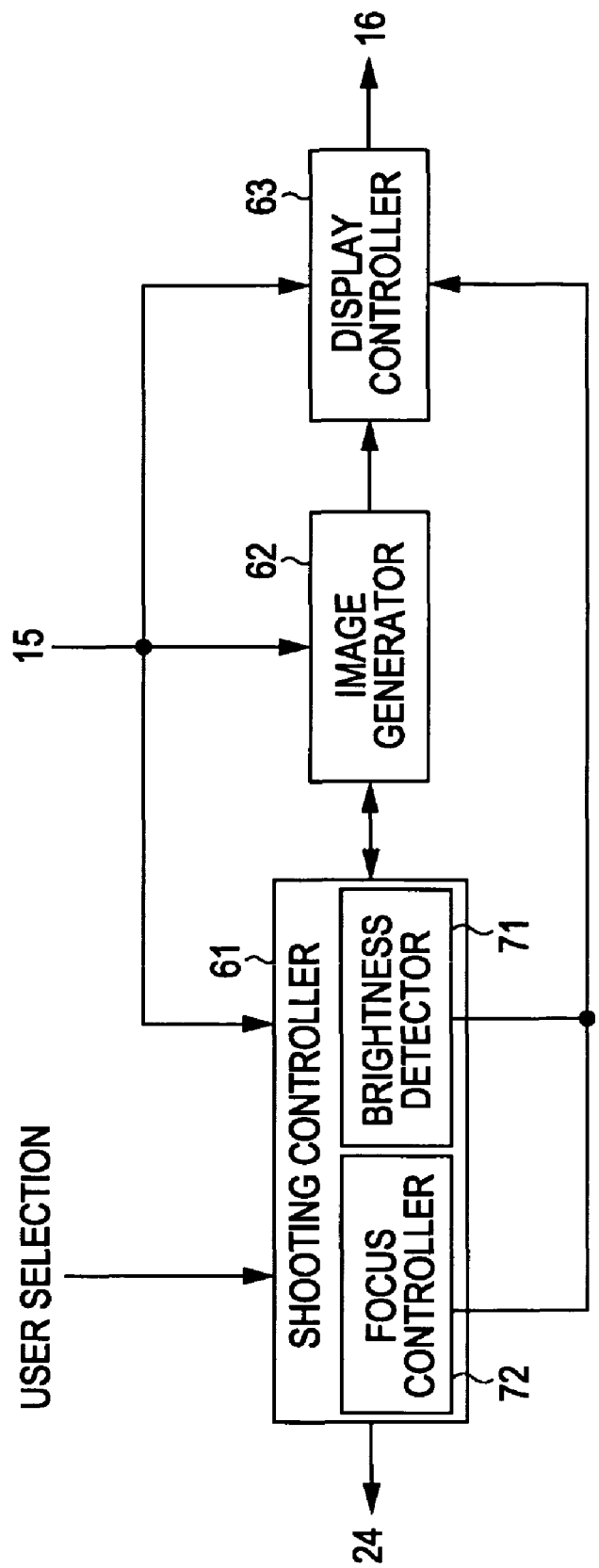
FIG. 8 is a block diagram showing an example of the functional configuration of the digital camera.

FIG. 8 is a block diagram of an example of the functional configuration of the digital camera 1. At least some of the functions displayed in FIG. 8 are implemented by the CPU 18 shown in FIG. 1 by executing a predetermined program.

The digital camera 1 includes the shooting controller 61, the image generator 62, and the display controller 63. The shooting controller 61 includes a brightness detector 71 and a focus controller 72.

The shooting controller 61 controls the motor driver 24 and controls the overall shooting operation. The shooting controller 61 appropriately changes the shooting mode and the settings of the shutter speed, aperture, exposure, and the like in accordance with the shooting environment and allows the digital camera 1 to capture an image.

For example, when the user selects a certain image from among images displayed by the brightness correction navigation function on the display unit 16, the shooting controller 61 changes the exposure setting (the settings of the shutter speed, aperture, ISO sensitivity, etc.) so that an image with the same brightness as that of the selected image can be captured and allows the digital camera 1 to perform subsequent shooting. Information regarding the brightness of the image generated by the image generator 62 with the help of the brightness correction navigation function and displayed on the display unit 16 is supplied from the image generator 62.

When the user selects a certain image from among images displayed by the macro shooting navigation function on the display unit 16, the shooting controller 61 sets the shooting mode indicated by the selected image. As a result, an in-focus image of even a very close object that is difficult to be captured in focus using the autofocus function can be captured.

The brightness detector 71 included in the shooting controller 61 determines whether the exposure of the captured image is appropriate on the basis of data supplied from the digital signal processor 15. When it is determined that the exposure is too much or too little, the brightness detector 71 outputs information indicating that to the display controller 63 and outputs the present exposure information to the image generator 62.

The focus controller 72 controls focus on the basis of the contrast of image data supplied from the digital signal processor 15, thereby performing the autofocus function. The focus controller 72 gradually brings the focus position from a predetermined position closer to the digital camera 1 and determines whether the user is trying to capture an image of an object closer than the autofocus function can focus on the object (determines whether there is no in-focus position). If the determination is affirmative, the focus controller 72 outputs information indicating that to the image generator 62 and the display controller 63.

Upon supply of the present exposure information of the captured image from the brightness detector 71, the image generator 62 changes the brightness level of the captured image supplied from the digital signal processor 15 and generates a brighter image and a darker image on the basis of the present exposure serving as the reference. The image generator 62 outputs the generated images to the display controller 63 and outputs information regarding the brightness levels of the generated images to the shooting controller 61.

Upon supply of the information from the focus controller 72 indicating that the user is trying to capture an image of an object closer than the autofocus function can focus on the object, the image generator 62 enhances the edges of the captured image (out-of-focus image) supplied from the digital signal processor 15 to generate an image representing the macro mode. In addition, the image generator 62 enlarges the generated image representing the macro mode with respect to a predetermined position thereof as the center of enlargement to generate an image representing the magnifying mode. The image generator 62 outputs the generated images (the image representing the macro mode and the image representing the magnifying mode) to the display controller 63.

Upon notification of the inappropriate exposure of the captured image from the brightness detector 71, the display controller 63 displays a message informing the user that the captured image is dark or bright in the message display region 37 of the display unit 16. On the basis of the data supplied from the digital signal processor 15, the display controller 63 displays the captured image in the captured-image display region 31. On the basis of the data supplied from the image generator 62, the display controller 63 displays the images with different brightness levels in a column with respect to the image representing the exposure state in the present setting as the center. Accordingly, the screen shown in FIG. 2 is displayed.

Upon notification from the focus controller 72 that the user is trying to capture an image of an object closer than the autofocus function can focus on the object, the display controller 63 displays a message informing the user that the image is out of focus in the message display region 37 of the display unit 16. On the basis of the data supplied from the digital signal processor 15, the display controller 63 displays the captured image in the captured-image display region 31. On the basis of the data supplied from the image generator 62, the display controller 63 displays the image representing the macro mode and the image representing the magnifying mode in a column. Accordingly, the screen shown in FIG. 6 is displayed.

Next, processes in the case where the brightness correction navigation function is turned on and in the case where the macro shooting navigation function is turned on will be described.

Referring to the flowchart of FIG. 9, the process in the case where the brightness correction navigation function is turned on will be described.

In step S1, the shooting controller 61 receives light from an object to be photographed. Specifically, the shooting controller 61 controls the TG 23 and causes the CCD 12 to convert light received from the object via the lens unit 11 into an electrical signal. Next, the shooting controller 61 causes the analog signal processor 13 and the A/D converter 14 to obtain a digital signal or image data. Further, the shooting controller 61 causes the digital signal processor 15 to process the obtained image data. The image data obtained by the digital signal processor 15 is displayed as a captured image on the display unit 16 and is supplied to the shooting controller 61.

In step S2, the brightness detector 71 included in the shooting controller 61 determines whether the exposure of the captured image is appropriate on the basis of the data supplied from the digital signal processor 15. When it is determined that the exposure is too much or too little, the brightness detector 71 outputs information indicating that to the display controller 63. Also, the brightness detector 71 outputs the present exposure information to the image generator 62.

In step S3, the image generator 62 generates a brighter image and a darker image on the basis of the captured image supplied from the digital signal processor 15, with respect to the present exposure serving as the reference, and outputs the generated images to the display controller 63. Also, the image generator 62 outputs information regarding the brightness levels of the generated images to the shooting controller 61.

In step S4, on the basis of the data supplied from the digital signal processor 15 and the image generator 62, the display controller 63 displays the three types of images with different brightness levels, i.e., the image representing the exposure state in the present setting, the brighter image, and the darker image, next to the captured image displayed on the display unit 16. At this time, the display controller 63 displays a message informing the user that the captured image is dark or bright in the message display region 37.

In step S5, the shooting controller 61 determines whether an image is selected by the user from among the images with different brightness levels displayed in step S4, that is, whether the brightness of an image to be captured is selected by the user.

When it is determined in step S5 that the brightness of an image to be captured is selected by the user, the shooting controller 61 proceeds to step S6 and changes the exposure setting by changing the settings of the shutter speed, aperture, ISO sensitivity, etc., thereby enabling the user to capture an image with the same brightness level as that of the image selected by the user.

When the shutter release is pressed, in step S7, the shooting controller 61 captures an image with the exposure changed in step S6. Image data obtained by capturing the image is obtained and compressed by the digital signal processor 15.

In step S8, the shooting controller 61 controls the digital signal processor 15 to store the captured image on the recording device 17, and the process is completed.

In contrast, when it is determined in step S5 that the brightness is not selected since the bracket shooting button 35 is selected on the screen displayed in step S4, the shooting controller 61 proceeds to step S9. The shooting controller 61 changes the exposure setting to different levels every time the shutter release is pressed and continuously captures images. The digital signal processor 15 obtains a plurality of images with different brightness levels.

In step S10, the display controller 63 displays the plurality of images with different brightness levels, which are obtained by the digital signal processor 15, as shown on the right-hand side of FIG. 3 and allows the user to select an image to save. When an image to save is selected, the process proceeds to step S8 and the image selected by the user is saved. Subsequently, the process is completed.

With the process described above, the user can easily capture an image with appropriate exposure.

Figure 10:
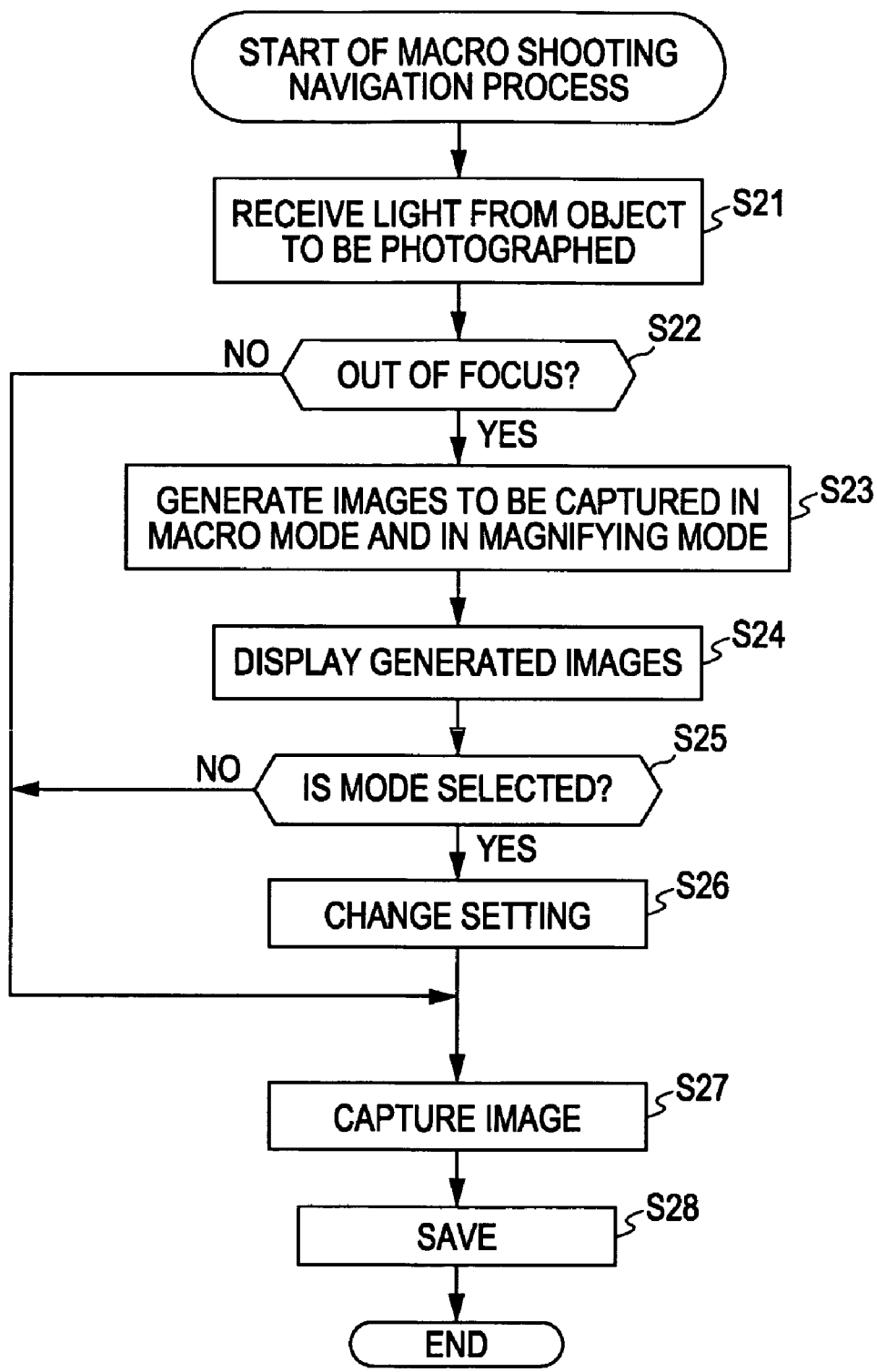

Referring now to the flowchart of FIG. 10, the process in the case where the macro shooting navigation function is turned on will be described.

In step S21, the shooting controller 61 receives light from an object to be photographed. Specifically, the shooting controller 61 controls the TG 23 and causes the CCD 12 to convert light received from the object via the lens unit 11 into an electrical signal. Next, the shooting controller 61 causes the analog signal processor 13 and the A/D converter 14 to obtain a digital signal or image data. Further, the shooting controller 61 causes the digital signal processor 15 to process the obtained image data. The image data obtained by the digital signal processor 15 is displayed as a captured image on the display unit 16 and is supplied to the shooting controller 61.

In step S22, on the basis of the contrast of the image data supplied from the digital signal processor 15, the focus controller 72 determines whether it is difficult to focus on the object using the autofocus function since the object is too close. When it is determined that the object is out of focus, the process proceeds to step S23. When it is determined that it is difficult to focus on the object, the focus controller 72 outputs information indicating that to the image generator 62 and the display controller 63.

In step S23, the image generator 62 enhances the edges of the captured image supplied from the digital signal processor 15 to generate an image representing the macro mode. Also, the image generator 62 enlarges the generated image with respect to a predetermined position thereof as the center of enlargement to generate an image representing the magnifying mode. The image generator 62 outputs the image representing the macro mode and the image representing the magnifying mode to the display controller 63.

In step S24, on the basis of the data supplied from the image generator 62, the display controller 63 displays the image representing the macro mode and the image representing the magnifying mode in a column. At the same time, the display controller 63 displays a message informing the user that the image is out of focus in the message display region 37 and displays the captured image in the captured-image display region 31.

In step S25, the shooting controller 61 determines whether an image is selected by the user from among the images representing the shooting modes, which are displayed in step S24. That is, it is determined whether the shooting mode is selected by the user.

When it is determined in step S25 that the shooting mode is selected by the user, the shooting controller 61 proceeds to step S26 and changes the setting of the shooting mode to the macro mode or the magnifying mode. The shooting controller 61 controls the motor driver 24 to change the focus range of the lens unit 11. As a result, the user can capture an in-focus image of even an object at a distance at which it is difficult to focus on the object using the autofocus function.

When the shutter release is pressed, in step S27, the shooting controller 61 captures an image in the macro mode or the magnifying mode. The shooting controller 61 proceeds to step S28 and stores the obtained image on the recording device 17. Subsequently, the process is completed.

In contrast, when it is determined in step S22 that the image is focused on the object, or when it is determined in step S25 that the mode is not selected, the process proceeds to step S27, and the subsequent steps are performed. In other words, an image is captured without changing the shooting mode setting.

With the process described above, the user can easily change the setting of the shooting mode and capture an image of even an object difficult to be focused on using the autofocus function.

In the above description, the images generated on the basis of the captured image are displayed as the images for enabling the user to select the brightness of an image to be captured or to select the shooting mode. Alternatively, images prepared in advance may be displayed, and an image from among these images may be selected to set the brightness or the shooting mode of an image to be captured. In this case, for example, on the screen shown in FIG. 6, the icon (flower mark) representing the macro mode and the icon (magnifying glass mark) representing the magnifying mode are displayed instead of the image 51 and the image 52, respectively.

In the above description, one brighter image and one darker image based on the present brightness serving as the reference are displayed on the screen in the case where the brightness correction navigation function is turned on. Alternatively, many more images with different brightness levels may be displayed, and an image may be selected from among the images to select the desired brightness.

In the above description, the cases in which the images and messages are displayed to advise the user on the brightness adjustment and the shooting modes have been described. Alternatively, the user may be advised on other settings, such as the white balance adjustment.

In the above description, the macro mode and the magnifying mode are displayed as the shooting modes that the user can select. Alternatively, other shooting modes may be displayed in accordance with conditions.

The series of processes described above can be executed either by hardware or by software. When the series of processes is executed by software, programs constituting the software are installed on a computer embedded in special hardware, or are installed from a program recording medium to a general-purpose personal computer or the like that allows executing various functions with various programs installed thereon.

Figure 11:
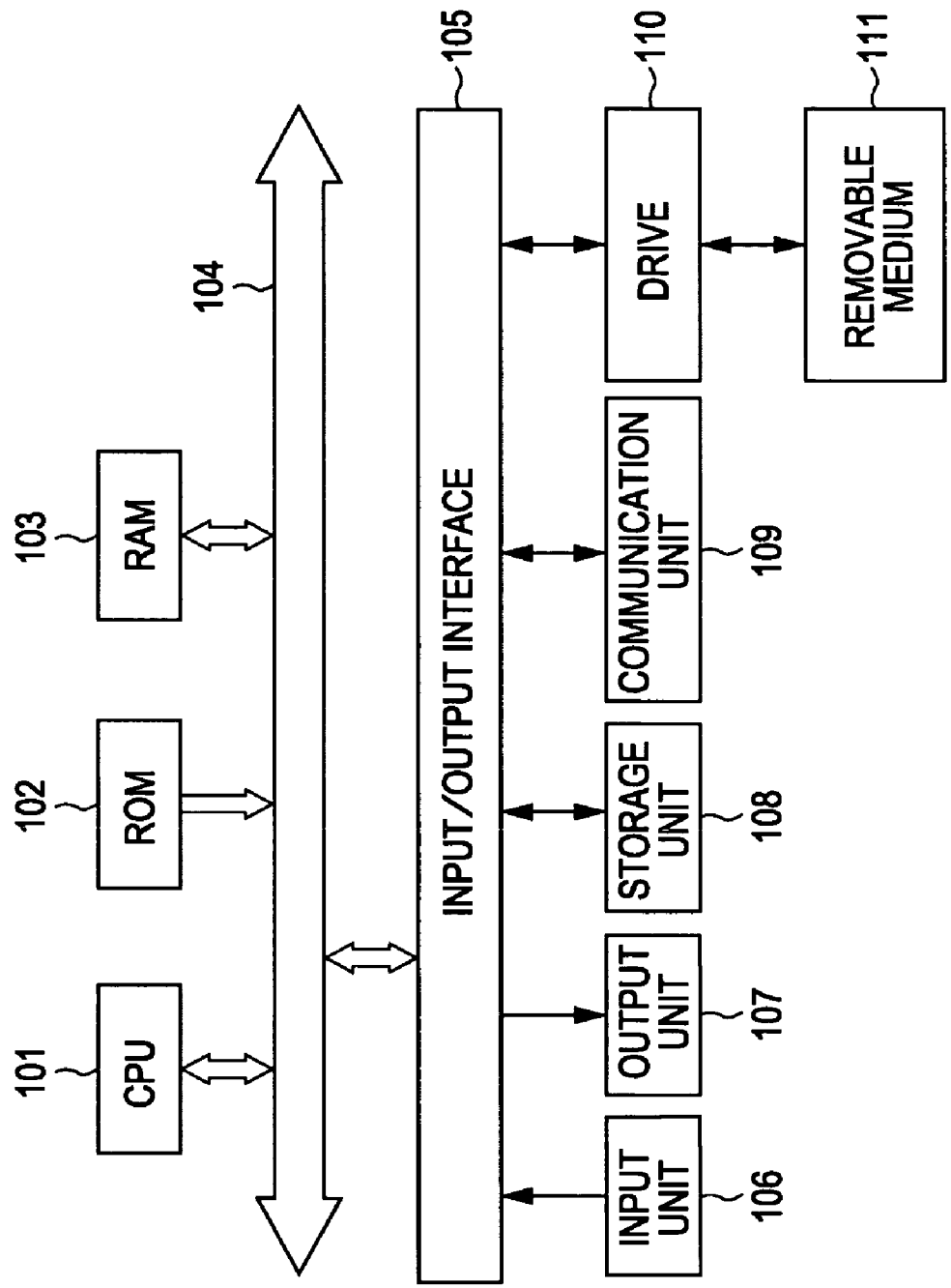
FIG. 11 is a block diagram showing an example of the configuration of a personal computer.

FIG. 11 is a block diagram of an example of the configuration of a personal computer for executing the series of processes described above using programs. A CPU 101 performs various processes in accordance with programs stored in a ROM 102 or a storage unit 108. If necessary, a RAM 103 also stores programs executed by the CPU 101 and data. The CPU 101, the ROM 102, and the RAM 103 are connected with one another using a bus 104.

The CPU 101 may include Cell, which is described in an article entitled "Cell Tanjo (The birth of Cell)", Nikkei Electronics, Nikkei Business Publications, Inc., Feb. 28, 2005, pp. 89-117.

The CPU 101 is connected via the bus 104 to an input/output interface 105. The input/output interface 105 is connected to an input unit 106 including a keyboard, a mouse, a microphone, or the like, and an output unit 107 including a display, a speaker, or the like. The CPU 101 executes various processes in response to commands input from the input unit 106. The CPU 101 outputs the results of the processes to the output unit 107.

The storage unit 108 connected to the input/output interface 105 includes, for example, a hard disk, and stores programs executed by the CPU 101 and various types of data. A communication unit 109 communicates with external devices via a network, such as the Internet or a local area network (LAN).

Programs may be obtained via the communication unit 109 and stored on the storage unit 108.

When a removable medium 111, such as a magnetic disk, an optical disk, a magneto-optical disk, or a semiconductor memory is loaded, a drive 110 connected to the input/output interface 105 drives the removable medium 111 and obtains programs and data recorded in the removable medium 111. The obtained programs and data are transferred, if necessary, to the storage unit 108 and stored on the storage unit 108.

A program recording medium having stored thereon a computer-executable program to be installed on a computer may include, as shown in FIG. 11, the removable medium 111, which is a package medium including a magnetic disk (including a flexible disk), an optical disk (including a compact disc-read only memory (CD-ROM) and a digital versatile disc (DVD)), a magneto-optical disk, or a semiconductor memory, the ROM 102 having temporarily or permanently stored therein the program, and the hard disk included in the storage unit 108. The program is stored in the program recording medium, if necessary, via the communication unit 109, which is an interface including a router or a modem, or using a wired or wireless communication medium including a LAN, Internet, or digital satellite broadcasting.

In the specification, the steps forming the program recorded on the recording medium are not necessarily performed in accordance with the time sequence following the order described above. Alternatively, the steps may be performed in parallel or individually.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus comprising:
   shooting control means for capturing a first image of a scene according to a selected shooting mode from among a plurality of shooting modes, wherein the plurality of shooting modes provide different shooting settings;
   determining means for determining whether the selected shooting mode is sufficient for taking a photograph of the scene based on the first image, and whether there is any other different shooting mode recommended for improving the first image when the first image is insufficient for taking a photograph of the scene;
   generating means for generating a second image of the scene based on the first image, the second image representing a photographic image of the scene captured according to a second shooting mode recommended by the determining means, the second shooting mode being different from the selected shooting mode; and
   display control means for displaying the first image, with the second image generated by the generating means, along with information indicating that the second shooting mode is recommended including a graphical indication;
   wherein the scene includes an object to be photographed, and
   wherein, if the first image is insufficient, the graphical indication comprises modifying an outline of the object.

2. The image processing apparatus according to claim 1, wherein the display control means displays the second image generated by the generating means together with the first image such that the second image generated by the generating means has a size smaller than that of the first image.

3. The image processing apparatus according to claim 1, wherein the generating means generates, as the image to be captured with the second shooting mode, an image with a focus range different from that of the first image.

4. The image processing apparatus according to claim 3, wherein, when the first image is out of the range in which an autofocus function can focus, the display control means displays a message advising a change in shooting mode.

5. The image processing apparatus according to claim 1, wherein the graphical indication further comprises displaying a textual description to the user regarding the state of the first image and why the captured monitoring image is insufficient.

6. The image processing apparatus according to claim 1, wherein the display control means further displays modification information on the generated second image, the modification information providing a visual indication of the changes made to the first image to result in the generated second image.

7. The image processing apparatus according to claim 6, wherein the modification information comprises textual information displayed on the generated second image, the textual information informing a user of the changes made to the first image to result in the generated second image.

8. The image processing apparatus according to claim 1, wherein the graphical indication is displayed on the first image at a location where the first image is insufficient.

9. The image processing apparatus of claim 1, further comprising:
   control means for controlling the shooting control means to photograph the scene in the selected shooting mode when the first image displayed by the display control means is selected, or to photograph the scene in the second shooting mode when the second image is selected.

10. An image processing method comprising the steps of:
    capturing a monitoring image of a scene according to a selected shooting mode from among a plurality of shooting modes, wherein the plurality of shooting modes provide different shooting settings;
    determining whether the selected shooting mode is sufficient for taking a photograph of the scene based on the captured monitoring image, and whether there is any other different shooting mode recommended for improving the captured monitoring image when the captured monitoring image is insufficient for taking a photograph of the scene;
    generating a second image of the scene based on the captured monitoring image, the second image representing a photographic image of the scene captured according to a recommended second shooting mode which is different from the first shooting mode; and
    displaying the captured monitoring image, with the second generated image, along with information indicating that the second shooting mode is recommended including a graphical indication,
    wherein the scene includes an object to be photographed and wherein the graphical indication comprises modifying an outline of the object to be photographed.

11. The image processing method of claim 10, further comprising:
    photographing the scene in the selected shooting mode when the displayed captured monitoring image is selected by the user, or photographing the scene in the second shooting mode when the displayed second generated image is selected by the user.

12. An image processing apparatus comprising:
    control means for capturing a monitoring image of a scene at a moment in time according to a selected shooting mode from among a plurality of shooting modes, wherein the plurality of shooting modes provide different shooting settings;
    determining means for determining whether the selected shooting mode is sufficient for taking a photograph of the scene based on the captured monitoring image, and whether there is any other different shooting mode recommended for improving the captured monitoring image when the captured monitoring image is insufficient for taking a photograph of the scene;
    generating means for generating a second image of the scene based on the captured monitoring image before the scene is photographed, the second image representing a photographic image of the scene captured according to a second shooting mode recommended by the determining means, the second shooting mode being different from the selected shooting mode;
    display control means for displaying the captured monitoring image, with the second image generated by the generating means, along with information indicating that the second shooting mode is recommended and a graphical indication of why the captured monitoring image is insufficient; and control means for controlling the shooting control means to photograph the scene in the selected shooting mode when the captured monitoring image displayed by the display control means is selected by the user, or to photograph the scene in the second shooting mode when the second image displayed by the display control means is selected by the user, wherein the scene includes an object to be photographed and wherein the graphical indication comprises modifying an outline of the object to be photographed.

13. An image processing apparatus comprising:

control means for capturing a monitoring image of a scene at a moment in time according to a selected shooting mode from among a plurality of shooting modes, wherein the plurality of shooting modes provide different shooting settings;

determining means for determining whether the selected shooting mode is sufficient for taking a photograph of the scene based on the captured monitoring image, and whether there is any other different shooting mode recommended for improving the captured monitoring image when the captured monitoring image is insufficient for taking a photograph of the scene;

generating means for generating a second image of the scene based on the captured monitoring image, the second image representing a photographic image of the scene captured according to a second shooting mode recommended by the determining means, the second shooting mode being different from the selected shooting mode; and display control means for displaying the captured monitoring image, with the second image generated by the generating means, along with information indicating that the second shooting mode is recommended and including a graphical indication, wherein the scene includes an object to be photographed and wherein the graphical indication comprises modifying an outline of the object to be photographed.

14. The image processing apparatus of claim 13, further comprising:

control means for controlling the shooting control means to photograph the scene in the selected shooting mode when the captured monitoring image displayed by the display control means is selected by the user, or to photograph the scene in the second shooting mode when the second image displayed by the display control means is selected by the user.

15. The image processing apparatus of claim 14, wherein the graphical indication is an indication of why the captured monitoring image is insufficient.

* * * * *